(12) United States Patent
Raftery (10) Patent No.: US 10,044,629 B1
(45) Date of Patent: Aug. 7, 2018

(54) DYNAMIC TTL BASED ON ENDPOINT HEALTH CHECKING

(71) Applicant: Amazon Technologies, Inc., Seattle, WA (US)

(72) Inventor: James Brendan Raftery, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 779 days.

(21) Appl. No.: 14/492,653

(22) Filed: Sep. 22, 2014

(51) Int. Cl.
*H04L 29/08* (2006.01)
*H04L 12/911* (2013.01)
*H04L 12/24* (2006.01)

(52) U.S. Cl.
CPC .............. *H04L 47/70* (2013.01); *H04L 41/50* (2013.01)

(58) Field of Classification Search
CPC ................................ H04L 47/70; H04L 41/50
USPC .......................................................... 709/226
See application file for complete search history.

(56) References Cited

U.S. PATENT DOCUMENTS

| | | | | |
|---|---|---|---|---|
| 7,873,695 B2* | 1/2011 | Clegg | ................... | G06Q 10/107 709/206 |
| 9,130,954 B2* | 9/2015 | Joshi | ................... | H04L 67/1008 |
| 9,215,205 B1* | 12/2015 | Smith | ................... | H04L 61/1511 |
| 2010/0185781 A1* | 7/2010 | Anderson | ............... | G06F 15/16 709/248 |
| 2013/0073809 A1* | 3/2013 | Antani | ................... | G06F 12/121 711/136 |
| 2014/0068043 A1* | 3/2014 | Archbold | ............ | H04L 61/1511 709/223 |
| 2015/0237001 A1* | 8/2015 | Ivanov | ................ | H04L 61/2007 709/245 |
| 2016/0028847 A1* | 1/2016 | Bradshaw | ........... | H04L 67/2842 709/213 |
| 2016/0112500 A1* | 4/2016 | Kim | .................... | H04L 67/1031 709/226 |

* cited by examiner

*Primary Examiner* — Kevin Bates
*Assistant Examiner* — Nazia Naoreen
(74) *Attorney, Agent, or Firm* — Klarquist Sparkman, LLP (57) ABSTRACT

Dynamically determined time-to-live (TTL) values for responses to requests for resource records associated with domain names are provided herein. A resource record is selected from a group of available resource records associated with a domain name based on a resource record request. A TTL value is dynamically determined based on health check data for the selected resource record. The dynamically determined TTL value reduces connection failures and limits unnecessary computing resource use by using health check data to represent a confidence that an endpoint is still available and functioning properly.

18 Claims, 6 Drawing Sheets

DYNAMIC TTL BASED ON ENDPOINT HEALTH CHECKING

BACKGROUND

Users typically connect to computing resources accessible through the Internet using a domain name of the computing resource. A domain name service (DNS) acts to translate the domain name into an Internet protocol (IP) address of an endpoint to which the user's computer can actually connect. Many websites, web services, and others entities associated with a domain name have multiple possible endpoints to which a user's computer can connect. A DNS server selects an IP address of an endpoint associated with the domain and provides the IP address to the user's computer in a DNS response.

Endpoints periodically fail, are taken offline, or are unavailable for connection. To account for this, the DNS server assigns a time-to-live (TTL) value to the DNS response. The TTL value represents the time during which the provided DNS records, including the endpoint IP addresses, should be considered valid. Conventionally, the TTL value in a DNS response from an authoritative DNS server is static. Endpoints can fail during the time specified by the TTL value, resulting in connection failures. Even when static TTL values are selected to balance between computing resource cost to the DNS server and frequency of failure, both connection failures and unnecessary resource use remain problematic.

DETAILED DESCRIPTION

The examples described herein provide a time-to-live (TTL) value that both reduces connection failures and reduces unnecessary computing resource use. In the described examples, health check data is used to dynamically determine a TTL value. In a domain name service (DNS) framework, for example, health checks can be performed to verify that an endpoint associated with a domain name is still functioning or available. TTL values can be dynamically determined to reflect how recently a health check was performed. Because endpoints can fail at any time, the longer the time since the last health check, the lower the likelihood that the endpoint is still functioning properly. For a DNS response provided a short time after a health check has been performed on the corresponding endpoint, a higher TTL value can be used to reflect the higher level of confidence that the endpoint is still functioning properly. Similarly, for a DNS response provided a longer time after a health check has been performed, a lower TTL value can be used to reflect the lower level of confidence that the endpoint is still functioning properly.

Dynamically determining a TTL value to correspond to the confidence that a health check result is still valid reduces connection failures by determining lower TTL values when the health check result is "stale" and reduces unnecessary computing use by determining higher TTL values when a health check result is relatively "fresh" and is likely to still be valid. Examples are described below with reference to FIGS. 1-6.

Figure 1:
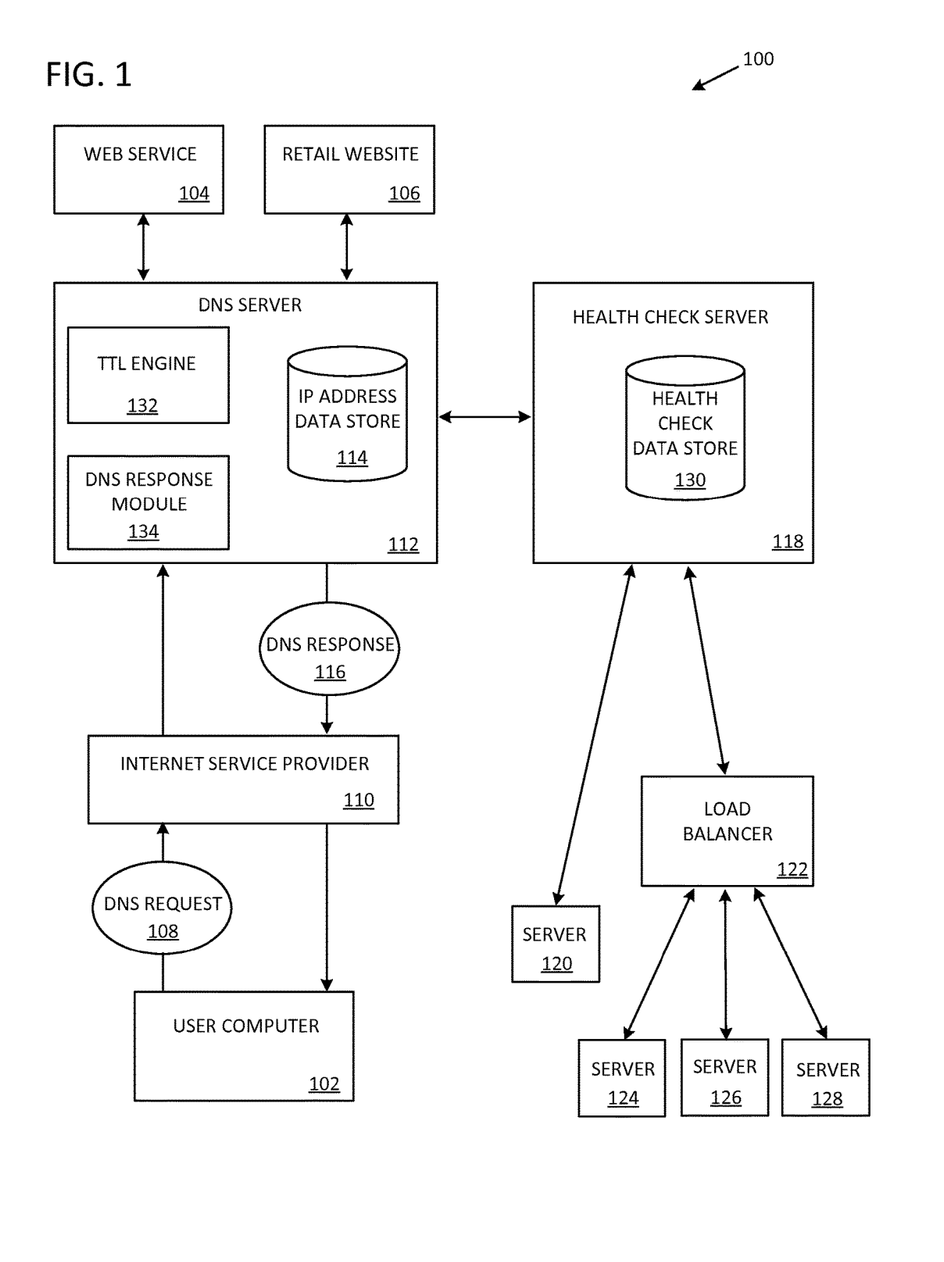
FIG. 1 is an example system in which a time-to-live (TTL) value is dynamically determined.

FIG. 1 illustrates a system 100 in which a TTL value is dynamically determined. When a user (not shown) attempts to access an Internet computing resource such as web service 104 or retail website 106, a domain name corresponding to web service 104 or retail website 106 is provided to user computer 102. User computer 102 then submits a DNS request 108 (also known as a DNS query) for a resource record associated with the domain name. DNS request 108 is transmitted to Internet service provider (ISP) 110 and then to DNS server 112, which can be, for example, an authoritative DNS server. Although FIG. 1 shows ISP 110 as the single intermediate stage between user computer 102 and DNS server 112, additional intermediaries can also be present in the communication chain between user computer 102 and DNS server 112. In some examples, if a DNS request similar to DNS request 108 has been previously submitted, and a DNS response that is still valid (i.e., the TTL has not elapsed) is stored locally (e.g. cached) either on user computer 102, by ISP 110, or at another intermediate stage in the communication chain, then the resource record specified in the stored response can be retrieved and used without transmitting DNS request 108 all of the way to DNS server 112.

The DNS resource record requested in DNS request 108 can be one of several different DNS resource record types. Example DNS resource record types include an Internet protocol version 4 (IPv4) address (A) record, an Internet protocol version 6 (IPv6) address (AAAA) record, a canonical name (CNAME) record, a mail exchange (MX) record, or a service locator (SRV) record. DNS resource records also include corresponding resource record data. For example, the resource record data for an A record is an IPv4 (32-bit) IP address, and the resource record data for an AAAA record is an IPv6 (128-bit) IP address. For simplicity and clarity, in many of the examples discussed herein, requests for resource records are discussed as requests for an IP address associated with a domain name, which can be requests for an A or an AAAA record. Other resource record requests are also contemplated.

DNS server 112 contains an IP address data store 114. IP address data store 114 stores IP addresses associated with domain names. IP address data store 114 can also store health check data for the stored IP addresses. In some examples, the stored IP addresses are provided by the entities to which they correspond. For example, web service 104 and retail website 106 can provide IP addresses of available endpoints associated with domain names for web service 104 and retail website 106. In response to a received DNS request, such as DNS request 108, DNS server 112 selects an IP address of an available endpoint from IP address data store 114. The selected IP address is provided in a DNS response, such as DNS response 116. DNS server 112 also contains other types of DNS data such as data corresponding to various DNS resource record types.

DNS server 112 receives health check data from health check server 118. Health check server 118 performs health checks on endpoints. As used herein, "endpoint" refers both to an individual server such as server 120, and an intermediate entity such as load balancer 122 that distribute traffic to multiple individual servers, such as servers 124, 126, and 128. Servers 120, 124, 126, and 128 and load balancer 122 can, for example, implement web service 104 and/or retail website 106. Health check data is stored in health check data store 130, and can be transmitted to DNS server 112 by being "pulled" on demand by DNS server 112 or by being "pushed" periodically by health check server 118. In some examples, health check data is transmitted to DNS server 112 after each health check is performed rather than being stored in health check data store 130.

Health check server 118 can perform health checks periodically, and the health check data communicated to DNS server 112 can include a health check result (e.g., endpoint functioning or available, endpoint unavailable, etc.) and a health check time. The health check time can be, for example, a time at which a most recent health check was performed or a time since the most recent health check was performed. In some examples, a health check frequency for IP addresses associated with particular domains is determined by the Internet computing resource associated with the domain, for example web service 104 or retail website 106. The health check frequency can be communicated to DNS server 112, which can instruct health check server 118, or the health check frequency can be communicated directly to health check server 118.

A TTL engine 132 dynamically determines a TTL value for DNS response 116 to DNS request 108. The dynamically determined TTL value is based at least in part on health check data for the IP address selected from IP address data store 114 that is provided in DNS response 116. For example, the TTL value, which represents the time during which the provided IP address should be considered valid, can reflect a time since a most recent health check was performed. Because endpoints can fail at any time, the time since the most recent health check was performed corresponds to a level of confidence that the endpoint associated with the IP address is still functioning properly. That is, as the time since the most recent health check continues to elapse, the confidence that the IP address is still functioning properly or is still available decreases.

As an example, using an interval between health checks of 60 seconds, a TTL dynamically determined when the time since the most recent health check is less than 10 seconds is higher than the TTL determined when the time since the most recent health check is 51 seconds (the next health check is less than 10 seconds away).

Figure 3:
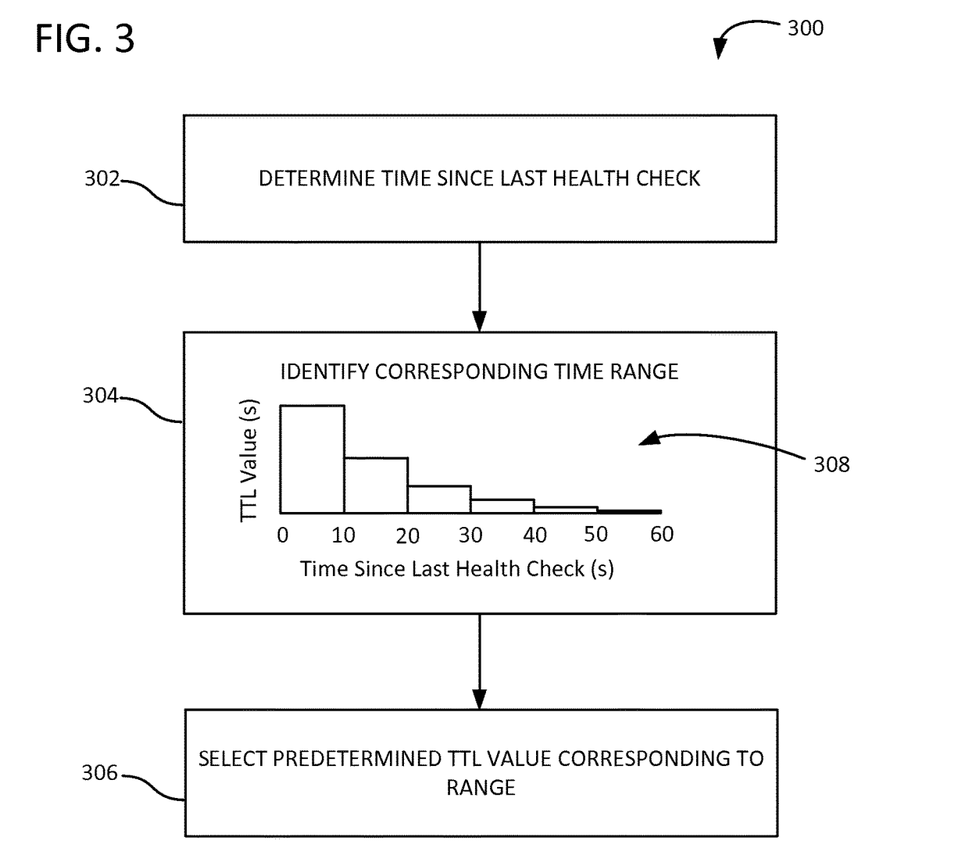
FIG. 3 is a flowchart of an example method for dynamically determining a TTL value by selecting a predetermined TTL value corresponding to a time since a most recent health check.

TTL engine 132 can dynamically determine the TTL value by providing the time since the most recent health check was performed or the time of the most recent health check as an input to one or more functions. A variety of functions can be used, including an exponential decay function (such as a half-life or other decay), a linear function, or a polynomial function. Other functions include a "bucket" approach in which the time interval between health checks is divided into discrete sub-intervals, and a predetermined TTL value is assigned to each sub-interval. The sub-interval corresponding to the time since the most recent health check can then be identified, and the TTL value is determined to be the pre-determined TTL value for the identified sub-interval. In some examples, the predetermined TTL values can approximate another function. For example, the predetermined TTL values can be selected to approximate a half-life decay over the sub-intervals of the time between health checks. An example of such an approach is illustrated in FIG. 3.

In other examples, a pre-determined TTL value can be used for some times since the most recent health check, and beyond a threshold, a TTL value can be determined by applying a function. For example, a maximum TTL value (e.g. 60 seconds or 2 minutes) can be used for DNS responses generated within a first portion of the interval between health checks (e.g. 10 seconds, 15 seconds, etc.), and a function can be applied for DNS responses generated after the first portion of the interval between health checks has elapsed. In one specific example, a predetermined TTL value of 60 seconds is used for DNS responses generated within 10 seconds of the most recent health check, and TTL values for DNS responses generated after 10 seconds since the most recent health check are determined by applying a half-life decay function with an initial value of 60 seconds or 30 seconds.

In other examples, different functions can be applied depending upon how much time has elapsed since the most recent health check. In still other examples, a function is applied to determine TTL values for DNS responses generated for a first portion of a time interval between health checks, and a predetermined TTL value, for example 5 seconds or 10 seconds, is used for DNS responses generated when the time since the most recent health check exceeds a threshold (e.g. 30 seconds).

The function(s) applied to dynamically determine a TTL value for a DNS response including a selected IP address can, in some examples, be determined by the Internet computing resource associated with the IP address. In other examples, TTL engine 132 selects one or more functions from a group of available functions (not shown) stored in DNS server 112.

A DNS response module 134 generates DNS response 116 to DNS request 108. In some examples, DNS response 116 includes a TTL field containing the dynamically determined TTL value determined by TTL engine 132.

The various components of FIG. 1 are in communication via one or more networks (not shown). The network(s) can be the Internet, a Local Area Network (LAN), a Wireless Local Area Network (WLAN), a Wide Area Network (WAN), or other type of network, wired or wireless. For example, user computer 102 communicates with DNS server 112 via the Internet (as managed by ISP 110). DNS server 112 can communicate with health check server 118 via the Internet or via another type of network.

Figure 2:
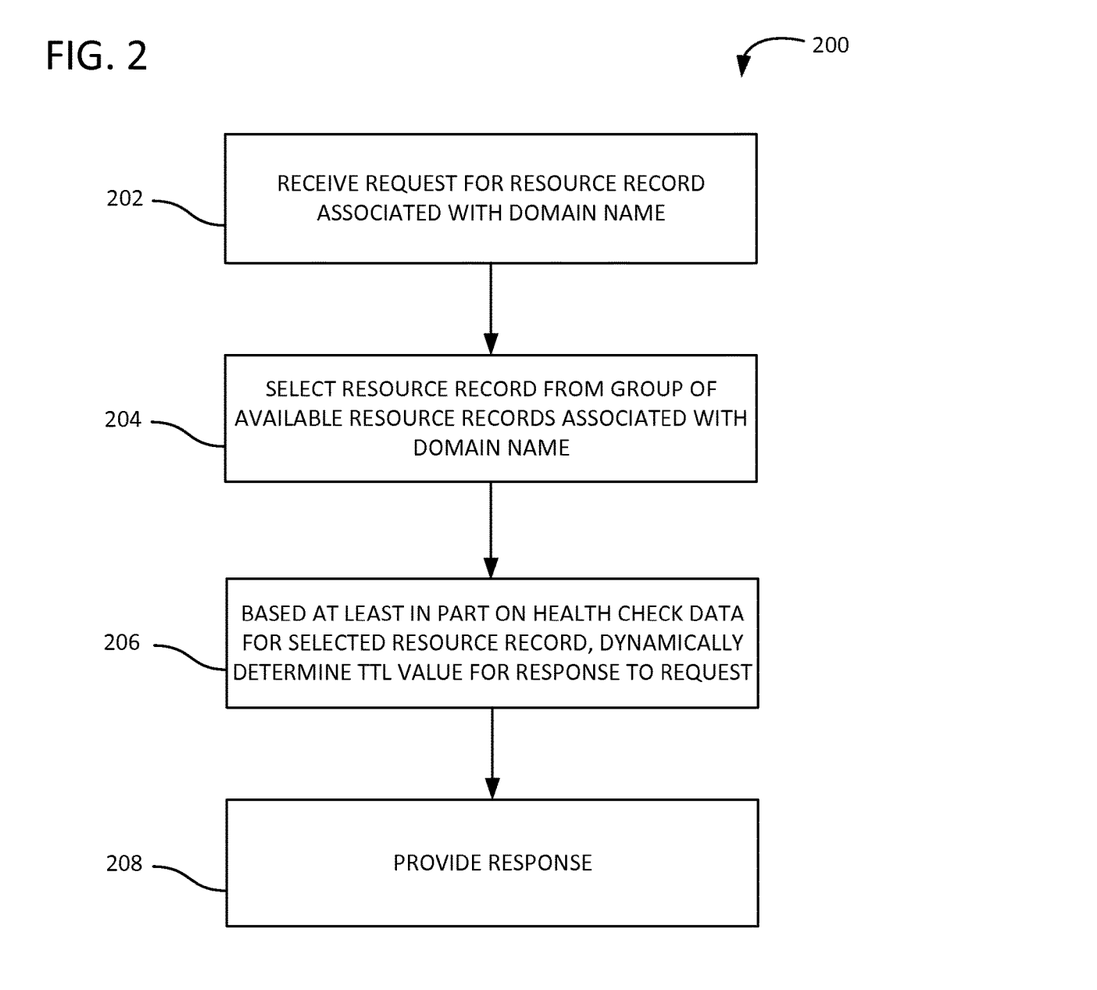
FIG. 2 is a flowchart of an example method for dynamically determining a TTL value based on health check data.

FIG. 2 illustrates an example method 200 of dynamically determining a TTL value. In process block 202, a request is received for a resource record associated with a domain name. The request can be, for example, a DNS request. The resource record can be, for example, a DNS resource record such as an A, AAAA, CNAME, MX, or SRV record. A resource record is selected from a group of available resource records associated with the domain name in process block 204. In process block 206, a TTL value for a response to the request is dynamically determined based at least in part on health check data for the selected resource record. In process block 208, the response to the request is provided. The response can be, for example, a DNS response, and can include the selected resource record and the dynamically determined TTL value.

FIG. 3 illustrates a method 300 of dynamically determining a TTL value by selecting a predetermined TTL value corresponding to a time since a most recent health check. In process block 302, a time since the most recent health check was performed is identified. This can be, for example, determined based on a time the most recent health check was performed or can be retrieval of the time since a most recent health check from a counter. The interval between health checks is divided into a plurality of predetermined time ranges (intervals). In process block 304, the predetermined time range corresponding to the time since the most recent health check was performed is identified. In process block 306, the predetermined TTL value corresponding to the time range is identified and used as the dynamically determined TTL value.

Process block 304 illustrates a graph 308 showing an example correspondence between TTL value and time since the last health check. In graph 308, the interval between health checks is 60 seconds, and the interval is divided into six sub-intervals of 10 seconds. For TTL values generated when the time since the last health check is less than 10 seconds, a maximum available TTL value is used (e.g., 60 seconds). For TTL values generated when the time since the last health check is between 10 seconds and 20 seconds, a TTL value of half of the maximum available TTL value is used (e.g. 30 seconds). This half-life pattern continues for the remaining sub-intervals. Although the sub-intervals shown in FIG. 3 are uniform, non-uniform sub-intervals are also contemplated.

Figure 4:
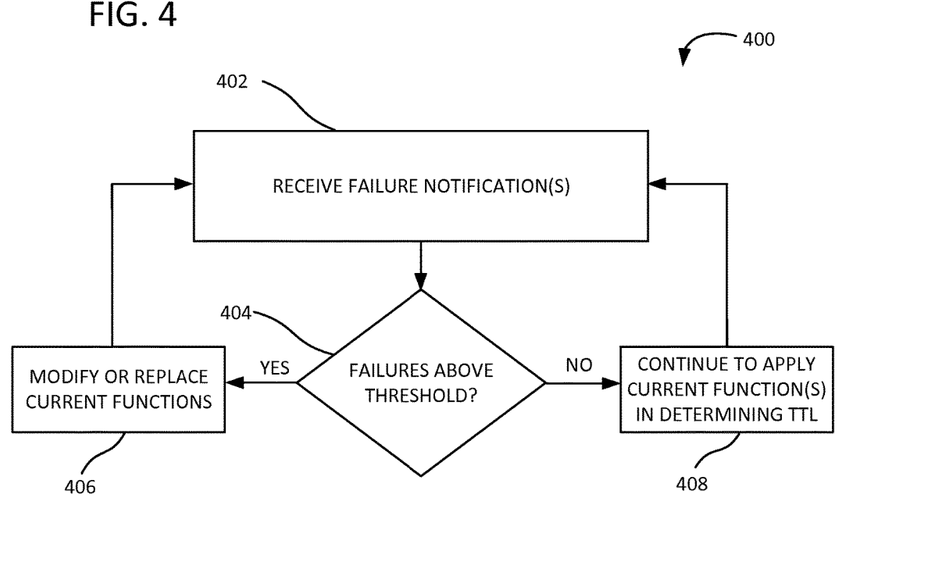
FIG. 4 is a flowchart of an example method for updating or replacing functions in response to failure notifications.

FIG. 4 illustrates a method 400 for updating or replacing functions in response to failure notifications. In some examples, a DNS server receives failure notifications when a user computer that has submitted a DNS request and received a DNS response with an IP address is unable to connect while the DNS response is still valid (according to the TTL) because the endpoint with the IP address is unavailable or not functioning properly. The one or more functions applied to dynamically determine a TTL value can be updated or replaced in response. For example, a variable, constant, initial value, final value, or other parameter or aspect of a function can be adjusted. In some examples, if particular functions result in high failure rates, these functions can be removed from a group of functions available for use to determine TTL value, and an alternative function can be added.

In process block 402, failure notification(s) are received. In decision box 404, it is determined if the total number of failures corresponding to the one or more functions being used to determine TTL has exceeded a threshold. If so, a current function is modified or replaced in process block 406. If not, the current function(s) continue to be applied in TTL determinations. Method 400 repeats as additional failure notifications are received.

Figure 5:
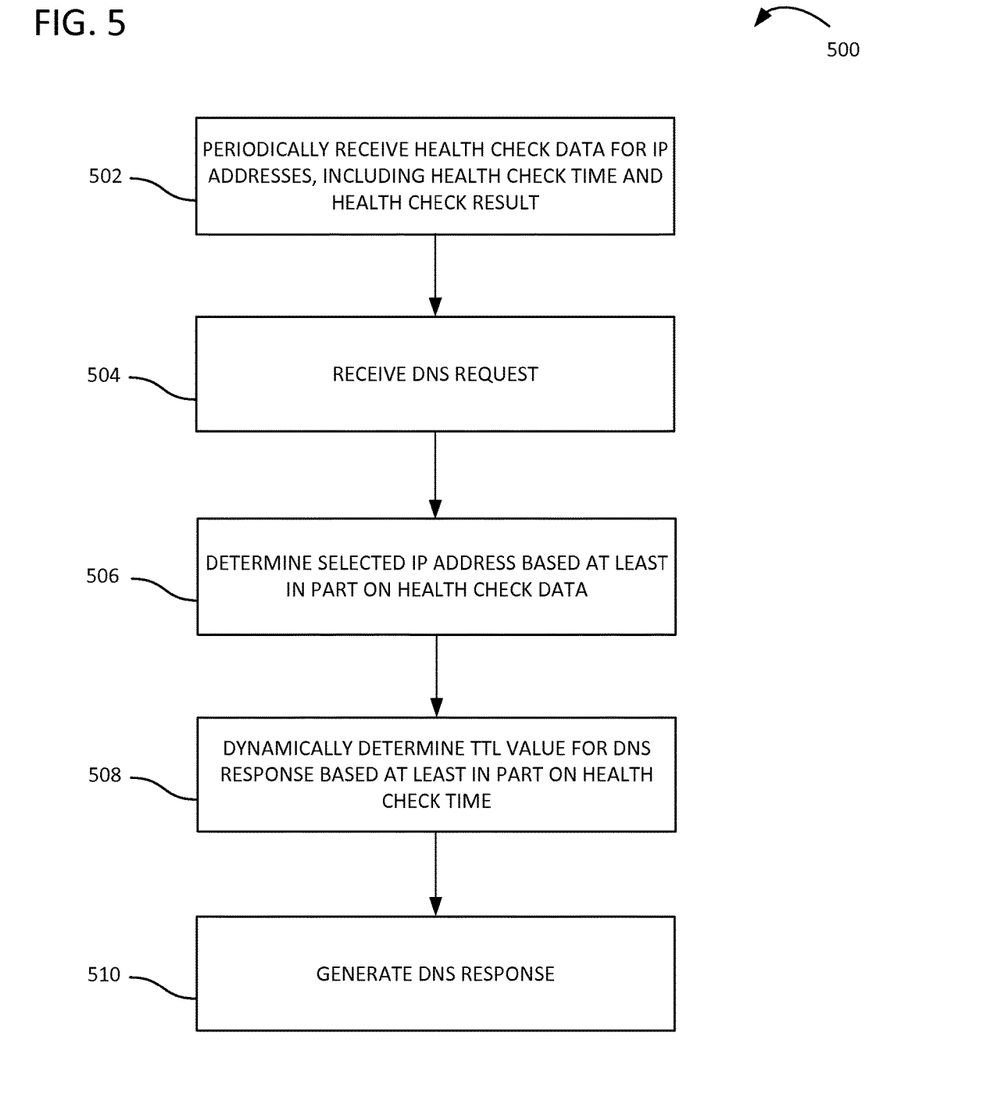
FIG. 5 is a flowchart of an example method of dynamically determining a TTL value in a domain name service (DNS) environment.

FIG. 5 illustrates a method 500 for dynamically determining a TTL value in a DNS environment. In process block 502, health check data for respective IP addresses in a group of IP addresses is periodically received. The health check data comprises a health check time for the IP address and a health check result. A DNS request is received in process block 504. The DNS request can originate from a client computing device. Based at least in part on the health check result for the IP addresses in the group of IP addresses, in process block 506, a selected IP address for a DNS response to the DNS request is determined. A TTL value for the DNS response is dynamically determined in process block 508 based at least in part on the health check time for the selected IP address. The dynamically determined TTL value can be determined, for example, based on one or more functions relating time since a most recent health check was performed to TTL value. In process block 510, a DNS response is generated. The DNS response includes the selected IP address and the dynamically determined TTL value. Method 500 can also comprise transmitting the generated DNS response to a client computing device, wherein the client computing device caches the DNS response and uses the selected IP address included in the DNS response to connect (e.g. to a web service or website) until the dynamically determined TTL value expires.

Examples of Computing Environments

Figure 6:
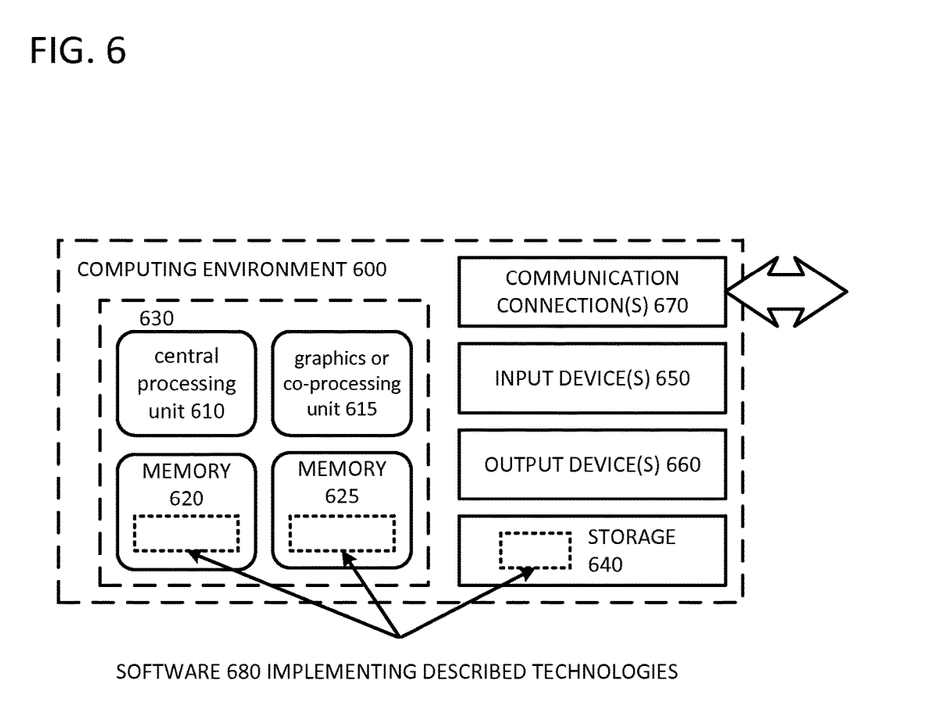
FIG. 6 is a generalized computing environment in which the described examples can be implemented.

FIG. 6 depicts a generalized example of a suitable computing environment 600 in which the described innovations may be implemented. The computing environment 600 is not intended to suggest any limitation as to scope of use or functionality, as the innovations may be implemented in diverse general-purpose or special-purpose computing systems. For example, the computing environment 600 can be any of a variety of computing devices (e.g., desktop computer, laptop computer, server computer, tablet computer, media player, gaming system, mobile device, etc.)

With reference to FIG. 6, the computing environment 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more examples described herein, in the form of computer-executable instructions suitable for execution by the processing unit(s). For example, memory 620 and 625 and software 680 can store computer-executable instructions for dynamically determining a TTL value.

A computing system may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The tangible storage 640 may be removable or non-removable, and includes magnetic disks, magnetic tapes or cassettes, CD-ROMs, DVDs, or any other medium which can be used to store information and which can be accessed within the computing environment 600. The storage 640 stores instructions for the software 680 implementing one or more innovations described herein. For example, software 680 can implement TTL engine 132 of FIG. 1.

The input device(s) 650 may be a touch input device such as a keyboard, mouse, pen, or trackball, a voice input device, a scanning device, or another device that provides input to the computing environment 600. For video encoding, the input device(s) 650 may be a camera, video card, TV tuner card, or similar device that accepts video input in analog or digital form, or a CD-ROM or CD-RW that reads video samples into the computing environment 600. The output device(s) 660 may be a display, printer, speaker, CD-writer, or another device that provides output from the computing environment 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A computer-implemented method comprising:
   periodically receiving health check data for respective Internet protocol (IP) addresses in a group of IP addresses, the health check data comprising a health check time for the IP address and a health check result, wherein the health check time indicates how recently the health check was performed;
   receiving a domain name service (DNS) request;
   based at least in part on the health check result for the IP addresses in the group of IP addresses, determining a selected IP address for a DNS response to the DNS request;
   dynamically determining a time-to-live (TTL) value for the DNS response based at least in part on the health check time for the selected IP address, wherein the dynamically determined TTL value is determined, at least in part, by applying one or more functions that use time since a most recent health check was performed to calculate the dynamically determined TTL value; and
   generating the DNS response, the DNS response including the selected IP address and the dynamically determined TTL value for the DNS response.

2. The computer-implemented method of claim 1, wherein the one or more functions comprise at least one of: an exponential decay function; a linear function; or a polynomial function.

3. The computer-implemented method of claim 1, further comprising upon determining that a number of connection errors for one or more IP addresses provided in DNS responses has exceeded a threshold, modifying or replacing at least one of the one or more functions upon which the dynamically determined TTL value is based.

4. The computer-implemented method of claim 1, wherein dynamically determining the TTL value comprises:

identifying a predetermined time range, of a plurality of predetermined time ranges, corresponding to a time since a most recent health check was performed; and selecting a predetermined TTL value corresponding to the identified time range.

5. The computer-implemented method of claim 1, wherein dynamically determining the TTL value comprises:

if a time since a most recent health check was performed is less than a threshold, selecting a pre-determined TTL value; and if the time since the most recent health check was performed is greater than the threshold, applying one or more functions relating time since the most recent health check was performed to the dynamically determined TTL value.

6. The computer-implemented method of claim 1, wherein the DNS request originates from a client computing device, and further comprising transmitting the DNS response to the client computing device, wherein the client computing device caches the DNS response and uses the selected IP address included in the DNS response to connect to a web service until the dynamically determined TTL value expires.

7. One or more non-transitory computer-readable storage media storing computer-executable instructions that, when executed, perform a method comprising:

receiving a domain name service (DNS) request for a resource record associated with a domain name;

selecting a resource record from a group of available resource records associated with the domain name;

based at least in part on health check data for the selected resource record, dynamically determining a time-to-live (TTL) value for a DNS response to the request wherein dynamically determining the TTL value for the response comprises applying one or more functions where time since a most recent health check was performed is an input to the one or more functions; and providing the response to the request, the response including the selected resource record and the dynamically determined TTL value.

8. The computer-implemented method of claim 1, wherein the one or more functions produce a higher TTL value when the DNS response is provided a short time after the most recent health check was performed, and produce a lower TTL value when the DNS response is provided a longer time after the most recent health check was performed.

9. The non-transitory computer-readable storage media of claim 7, wherein the resource record is a DNS resource record having a DNS resource record type, and wherein the DNS resource record type is one of an Internet protocol version 4 (IPv4) address (A) record, an Internet protocol version 6 (IPv6) address (AAAA) record, a canonical name (CNAME) record, a mail exchange (MX) record, or a service locator (SRV) record.

10. The non-transitory computer-readable storage media of claim 7, wherein the health check data comprises at least one of: a time at which a most recent health check was performed or a time since the most recent health check was performed.

11. The non-transitory computer-readable storage media of claim 7, wherein the one or more functions comprise at least one of: an exponential decay function; a linear function; or a polynomial function.

12. The non-transitory computer-readable storage media of claim 7, wherein the selected resource record is a domain name service (DNS) address (A) record or a DNS Internet protocol version 6 (IPv6) address (AAAA) record, and wherein the selected resource record specifies an IP address, the method further comprising:

after providing the response to the request, receiving a notification that one or more attempts to connect to the IP address specified in the selected resource record failed during the time specified by the dynamically determined TTL value; and in response to the notification, adjusting at least one of the one or more functions.

13. The non-transitory computer-readable storage media of claim 7, wherein a time interval between health checks for the resource record is divided into a plurality of sub-intervals, each sub-interval having an associated TTL value, and wherein dynamically determining the TTL value comprises determining the sub-interval corresponding to a time since a most recent health check was performed and identifying the associated TTL value.

14. The non-transitory computer-readable storage media of claim 7, wherein at least some resource records of the group of resource records are associated with load balancers.

15. A system comprising:

a domain name service (DNS) server comprising:

an Internet protocol (IP) address data store storing IP addresses associated with domain names and storing health check data for the IP addresses;

a time-to-live (TTL) engine that dynamically determines a TTL value for a DNS response to a received DNS request, the dynamically determined TTL value reflecting a time since a most recent health check was performed for an IP address selected for the DNS response, wherein a DNS response, generated by the DNS server in response to the received DNS request, includes a TTL field containing the dynamically determined TTL value;

wherein the TTL engine dynamically determines the TTL value by providing the time since the most recent health check was performed to one or more functions to obtain the TTL value.

16. The system of claim 15, wherein the DNS server is part of a DNS service that resolves DNS requests for domain names associated with a web service.

17. The system of claim 15, wherein upon determining that a number of connection errors for one or more IP addresses provided in DNS responses has exceeded a threshold, the TTL engine modifies or replaces at least one of the one or more functions used to determine the dynamically determined TTL value.

18. The system of claim 15, wherein the DNS server receives health check data resulting from periodic health checks, the health check data comprising, for the respective IP addresses, the time since the most recent health check for the IP address or a time of the most recent health check for the IP address.

* * * * *